(12) United States Patent
Prins

(10) Patent No.: US 6,238,716 B1
(45) Date of Patent: May 29, 2001

(54) CONDITIONED PACKAGING FOR SHELLFISH OR CRUSTACEANS

(75) Inventor: Jacobus Prins, Yerseke (NL)

(73) Assignee: Packpat B.V., Yerseke (NL)

( * ) Notice: Subject to any disclaimer, the term of this patent is extended or adjusted under 35 U.S.C. 154(b) by 0 days.

(21) Appl. No.: 09/572,567

(22) Filed: May 16, 2000

Related U.S. Application Data

(63) Continuation of application No. 09/186,685, filed on Nov. 5, 1998, now abandoned.

(51) Int. Cl.[7] .............................. A63B 4/16; A22C 29/00; A22C 29/04
(52) U.S. Cl. ...................... 426/129; 426/316; 426/410; 426/418; 426/643
(58) Field of Search ................................ 426/129, 316, 426/643, 410, 418

(56) References Cited

FOREIGN PATENT DOCUMENTS

| | | |
|---|---|---|
| 0 471 611 | 2/1992 | (EP) . |
| 0 721 743 | of 1996 | (EP) . |
| 0 720 954 | 7/1996 | (EP) . |
| 58-129930 | 8/1983 | (JP) . |
| 1-213174 | 8/1989 | (JP) . |
| 2-117336 | 5/1990 | (JP) . |
| 4-294767 | 10/1992 | (JP) . |
| 5-084038 | 4/1993 | (JP) . |
| 7-184511 | 7/1995 | (JP) . |
| 9401832 | 6/1996 | (NL) . |
| 9500027 | 8/1996 | (NL) . |

OTHER PUBLICATIONS

Y.C. Ho et al., "Journal of Aquatic Food Product Technology", vol. 6, No. 1, 1997, pp. 37–51.

J. Albada, "Verpakkings Manage", No. 5, May 1998, pp. 38–39.

T. Gopal et al., Fishery Technology, vol. 22, No. 1, 1985, pp. 48–51.

Verpacken von Fisch in modifizierter Atmosphaere. MAP von Fisch an Bord und an Land, 1995.

N. Church, Packaging (UK), vol. 66, No. 713, 1996, pp. 16–18.

B. Ooraikul et al., Modified atmosphere packaging of food, 1991, pp. 148–168.

M. Lannelongue et al., Journal of Food Science, vol. 47, No. 3, 1982, pp. 911–913.

D. Ward, Food Technology, vol. 42, No. 3, Mar. 1988, pp. 85–89.

M. Ismail Abdullah, ASEAN Food Journal, vol. 5, No. 3, Jul. 1990, pp. 96–102.

Yoshio Tanaka, Fudo Pakkejingu (Food Packaging), vol. 31, No. 3, 1987, pp. 42–50.

Activities Report of the R&D Associates, 2, 1987, pp. 40–44.

*Primary Examiner*—Steven Weinstein
(74) *Attorney, Agent, or Firm*—Young & Thompson

(57) ABSTRACT

A packaging for shellfish, such as mussels, or crustaceans, includes a closed container in which there is situated a quantity of living shellfish or crustaceans, optionally water originating from the shellfish or crustaceans, as well as a protective gas atmosphere. Subatmospheric pressure may prevail in the container. Furthermore, the sum of the quantities of $O_2$ and $CO_2$ may amount to 50% to 90% of the total gas content of the container, and the quantity of $O_2$ may amount to 25% to 50% of the total gas content of the container.

3 Claims, No Drawings

CONDITIONED PACKAGING FOR SHELLFISH OR CRUSTACEANS

CROSS-REFERENCE TO RELATED APPLICATIONS

This application is a continuation of application Ser. No. 09/186,685, filed Nov. 5, 1998, now abandoned.

The invention relates to the field of packaging shellfish or crustaceans, in particular, though not exclusively, mussels. Various possibilities already exist for packaging shellfish or crustaceans, and these can be divided into two main categories.

DESCRIPTION OF THE RELATED ART

In a first category, the shellfish or crustaceans are packaged fresh and alive, i.e. uncooked. In this case, the consumer has to remove the shellfish from the container during preparation and then cook them. In a second category, the shellfish are precooked, so that the consumer merely has to heat the shellfish briefly prior to consumption. An example of the latter category which may be mentioned is the packaging method which is known from EP-B-242,183 and FR-A-2,613,588.

SUMMARY OF THE INVENTION

The invention relates to a packaging belonging to the first category, i.e. packaging in which the shellfish or crustaceans are packaged fresh and alive, without being precooked. This category also included various possibilities.

DESCRIPTION OF THE PREFERRED EMBODIMENTS

Firstly, containers which are not closed, so-called "leaking" packages, can be used. Water from the shellfish or crustaceans can escape via the holes in the container, with the drawback that weight loss occurs and moreover the container becomes contaminated and does not smell fresh.

According to a second possibility, closed packagings can be used, such as for example those which are known from NL-A-9400391. A drawback of is option is that the containers take up a relatively large amount of space, up to double the volume of the packaged shellfish or crustaceans. Moreover, a relatively large quantity of material is used for containers of this nature, which represents a burden on the environment. Moreover, the packaging may be relatively heavy owing to water which is contained therein.

The object of the invention is to provide a packaging of the second category mentioned above, i.e. for fresh, uncooked, living shellfish or crustaceans which does not have these drawbacks. This object is achieved by means of a packaging for shellfish or crustaceans, such as mussels, comprising a closed, gas-tight and liquid-tight container in which there is a quantity of living shellfish or crustaceans, optionally water originating from the shellfish or crustaceans, as well as a protective gas atmosphere.

Since the container is closed, water is unable to leak out, with the result that the container remains clean on the outside. On the other hand, the freshness of the shellfish or crustaceans can be preserved, owing to the protective gas atmosphere which is introduced, for example including additional $O_2$ and $CO_2$. The addition of this gas atmosphere is of benefit to the taste and shelf life, even to such an extent that there is no longer any need to carry out subsequent inspection of the shellfish or crustaceans. During preparation, it is merely necessary to wash the shellfish, such as mussels, after which they can be cooked immediately.

Moreover, the gas mixture has a preserving effect, so that the growth of bacteria is inhibited.

Subatmospheric pressure may prevail in the container.

Preferably, the sum of the quantities of $O_2$ and $CO_2$ amounts to 50% to 90% of the total gas content of the container. Furthermore, the quantity of $O_2$ may preferably amount to 25% to 50% of the total gas content of the container.

The container is preferably a bag made of flexible material which is gas-tight and liquid-tight.

The packaging containing shellfish can be heated, for example, by means of a microwave oven.

Reference is made to a packaging for fish products as is known from Japanese patent application JP-A-58129930. This packaging has a container made of flexible material in which there is a quantity of $O_2$ and $CO_2$. However, the fish products must also be injected with an aqueous alkaline solution having a pH of 7–12. This packaging is unsuitable for shellfish or crustaceans, in view of the need to inject the fish products.

What is claimed is:

1. Packaging for live delivery of shellfish and crustaceans, said packaging comprising:

a closed, gas and liquid tight container;

a quantity of living shellfish or crustaceans within said container; and a protective gas atmosphere in the closed container comprising $O_2$ and $CO_2$, wherein the sum of the quantities of $O_2$ and $CO_2$ amount to 50% to 90% of the total gas content of the closed container and wherein the quantity of $O_2$ amounts to 25% to 50% of the total gas content of the closed container.

2. The packaging of claim 1, further comprising water originating from the shellfish or crustaceans.

3. The packaging of claim 1, wherein subatmospheric pressure prevails in said container.

* * * * *